Aug. 10, 1948.  P. B. ZEIGLER  2,446,973
MAGNETIC CHUCK AND LOADING DEVICE THEREFOR
Filed May 8, 1943  2 Sheets-Sheet 1
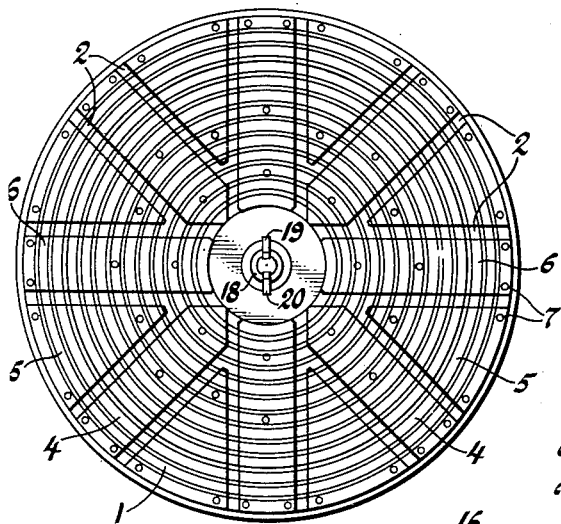
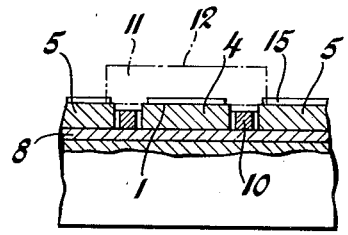
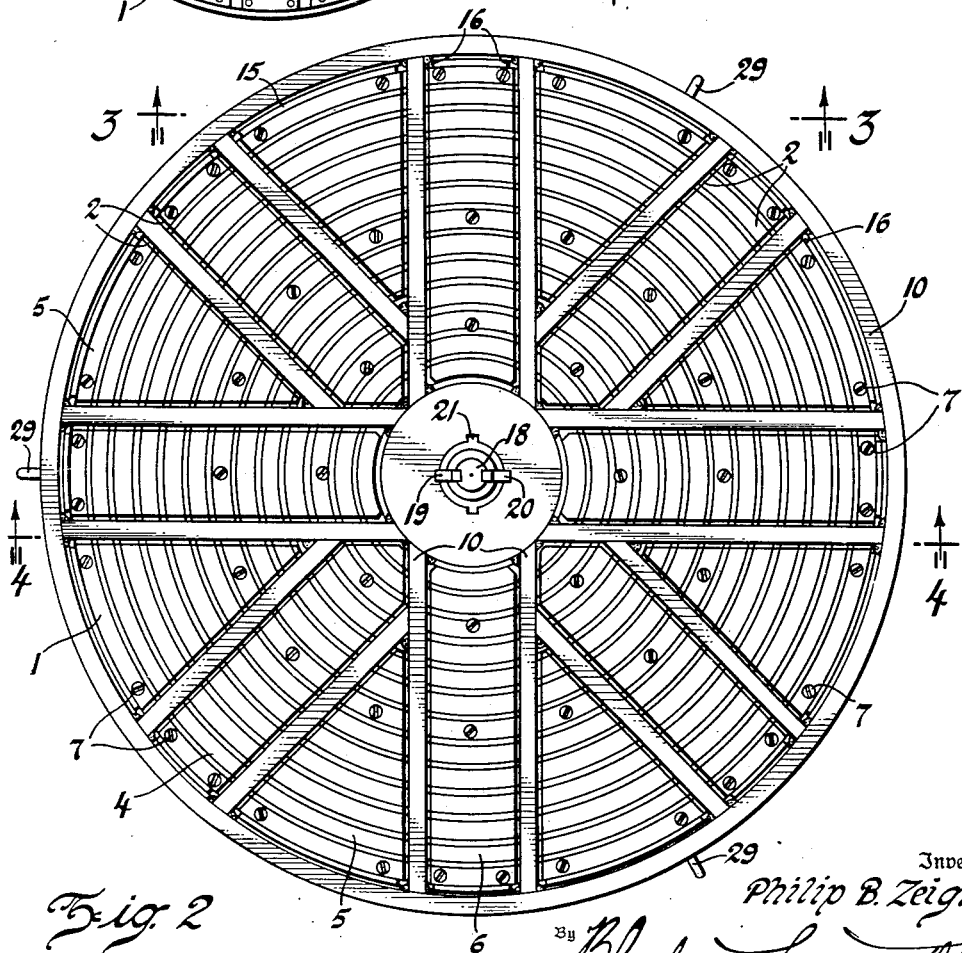
Inventor
Philip B. Zeigler
Attorneys Aug. 10, 1948.    P. B. ZEIGLER    2,446,973
MAGNETIC CHUCK AND LOADING DEVICE THEREFOR
Filed May 8, 1943    2 Sheets-Sheet 2

Inventor
Philip B. Zeigler
By Blackmore, Spencer & Flint
Attorneys

Patented Aug. 10, 1948

2,446,973

UNITED STATES PATENT OFFICE 2,446,973

MAGNETIC CHUCK AND LOADING DEVICE THEREFOR

Philip B. Zeigler, Saginaw, Mich., assignor to General Motors Corporation, Detroit, Mich., a corporation of Delaware Application May 8, 1943, Serial No. 486,191

3 Claims. (Cl. 175—21)

This invention relates to a magnetic chuck and especially to a magnetic chuck which is adapted to hold a plurality of parts in a specific arrangement.

The holding power of a magnetic chuck is dependent on the number of magnetic lines of force which can be made to pass from the pole pieces of the chuck through each of the parts being held, and this, of course, depends on the shape of the parts, the arrangement of the poles and the arrangement of the parts in relationship to the poles. It follows that the posiiton of the parts on the chuck is not unimportant and that for a given chuck a particular arrangement of the parts is desirable, especially if a maximum number of them are to be held at one time.

The object of the invention is a magnetic chuck with a face grooved to accommodate a loading frame on which the parts have been previously loaded in the required arrangement.

The above and other objects of the invention will be apparent as the description proceeds.

According to the invention, the grooves in the chuck, and the loading frame, are such that when the latter is positioned in the grooves and below the level of the face of the chuck, the parts originally located on the loading frame are similarly located in contact with the face of the magnetic chuck.

The drawings show the application of the invention to a chuck in which the polar face consists of a multiplicity of concentric insulated rings, and the parts to be held on the chuck are a multiplicity of identical short pieces of rectangular section.

In the drawings:

Figure 1 is a plan view of the face of the grooved chuck.

Figure 2 is an enlarged view of the chuck with an empty loading frame in position in the grooves thereof.

Figure 3 is a broken away sectional view on line 3—3 of Figure 2, with a part indicated by dot and dash lines in position on the chuck.

Figure 4:
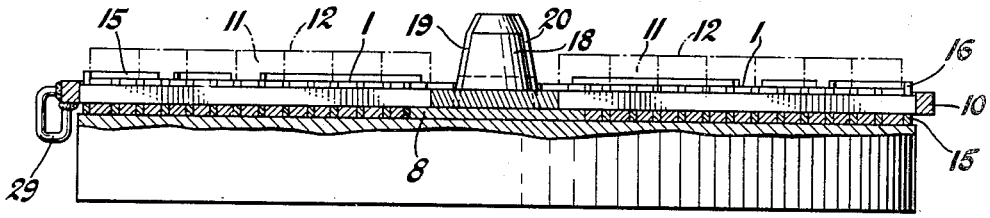
Figure 4 is a sectional view on line 4—4 of Figure 2, with parts indicated by dot and dash lines in position on the chuck.

As shown most clearly in Figures 1 and 3, the face I of a standard magnetic chuck with poles consisting of a multiplicity of concentric insulated rings is provided with grooves such as 2, by securing thereto sections such as 4, 5 and 6 of a similarly ringed plate by means of screws such as 7. Alternatively, of course, and provided the top 8 is sufficiently thick, the grooves can be directly cut therein.

The form and pattern of the grooves 2 is such as to accommodate a loading frame 10 or more particularly a loading rack of radial grid form for parts 11, which in the example illustrated are to be held on the chuck, for surface grinding of their top surfaces 12.

Fitted around the periphery of the top 8 and the sections such as 4, 5, and 6 of the chuck is a safety ring 15. It is notched as at 16 in continuation of the grooves 2 and provides a raised edge above the face I of the chuck to prevent the parts to be ground from flying off the chuck if the magnet fails while the chuck is revolving.

Secured centrally of the chuck is a tapered centering plug 18 with diametrically opposite lugs 19 and 20 cooperative with two diametrically opposite slots such as 21 in a tapered hole 25 in the center of the frame 10 for locating the frame in position to rest in the bottom of the grooves.

Figure 5:
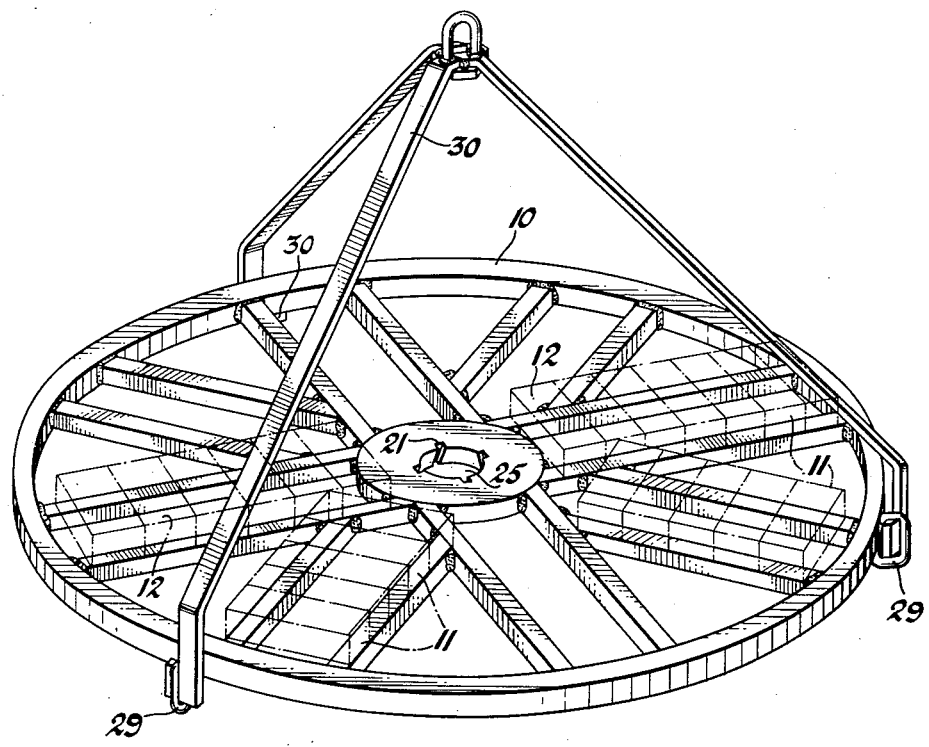
Figure 5 is a perspective view of the loading frame partially loaded with parts indicated by dot and dash lines, and a lifting hook therefor.

Spaced at intervals of 120° around the periphery of the frame 10 are three lugs 29 adapted to be engaged by a hook 30 (as shown in Figure 5) for transferring the frame between the chuck and a suitable loading and unloading table (not shown).

The parts 11 to be ground are laid on the frame 10 in the arrangement indicated in Figure 5, and the relative dimensions of the grooves 2 and the frame are such that when the loaded frame is lifted by the hook 30 into position over the centering plug 14 and lowered into the grooves 2, its top surface is below the face I of the chuck so that the parts 11 which were resting on the frame then rest in contact with the face I of the chuck. The frame, being made of steel, is itself magnetically held in the grooves. It will be appreciated that by the use of two frames, one frame may be loaded by an operator while the other frame is in the grooves of the chuck and imprisoned below the parts on the face of the chuck.

I claim:

1. A unit loadable magnetic chuck comprising a chuck having a face, grooves positioned in the face of said chuck, a loading part comprising a frame having rods to support the work during loading, said rods positioned and dimensioned for entry and removal from the grooves of said chuck face, the height of said frame rods being less than the depth of said grooves so that the work supported on the rods will rest in direct contact on the face of the magnetic chuck adjacent said grooves.

2. The combination according to claim 1 in which there are locating means including a plug on the chuck cooperative with a hole in the frame to position the frame in the grooves of the chuck.

3. The combination according to claim 1 in which the loading frame is of steel and is magnetically held in the grooves of the chuck.

PHILIP B. ZEIGLER.

REFERENCES CITED

The following references are of record in the file of this patent:

UNITED STATES PATENTS

| Number | Name | Date |
| --- | --- | --- |
| 181,244 | Campbell | Aug. 22, 1876 |
| 660,853 | Jennings | Oct. 30, 1900 |
| 699,066 | Baskett | Apr. 29, 1902 |
| 1,003,900 | Hanson | Sept. 19, 1911 |
| 1,105,552 | Downes | July 28, 1914 |
| 1,360,054 | Sweet | Nov. 23, 1920 |
| 1,510,564 | Stockfleth et al. | Oct. 7, 1924 |
| 1,814,374 | Finley | July 14, 1931 |
| 2,066,594 | Watson | Jan. 5, 1937 |
| 2,156,876 | Schull | May 2, 1939 |